3 Sheets—Sheet 1.
H. BURT.
KNITTING MACHINE.
No. 915.
Reissued Feb. 28, 1860.
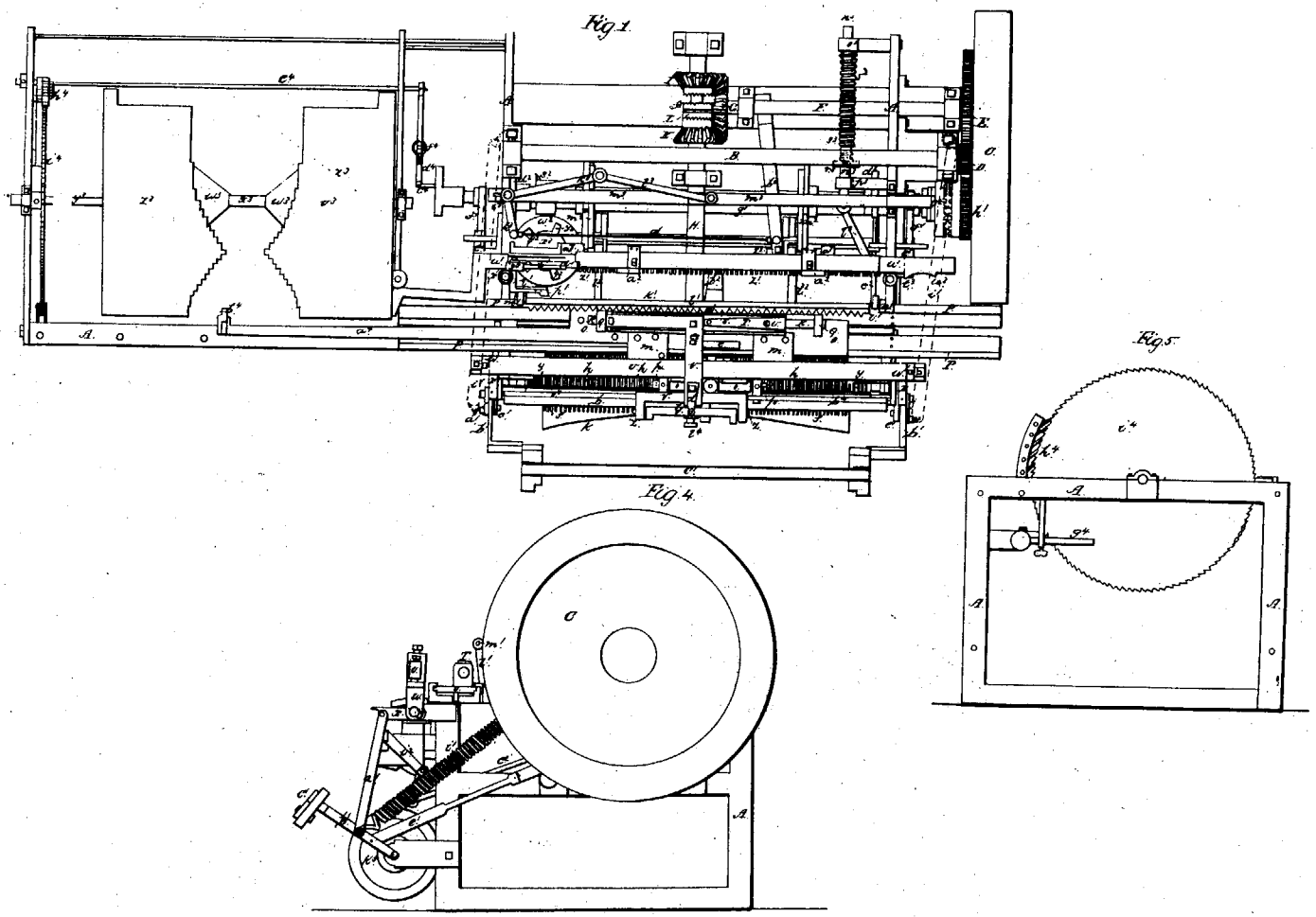
THE NORRIS PETERS CO., PHOTO-LITHO., WASHINGTON, D. C.

3 Sheets—Sheet 2.
H. BURT.
KNITTING MACHINE.
No. 915. Reissued Feb. 28, 1860.
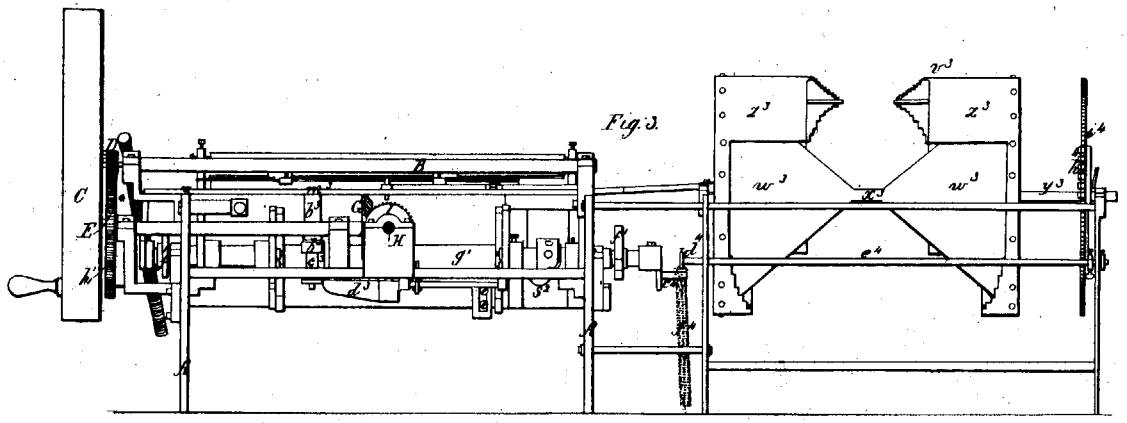
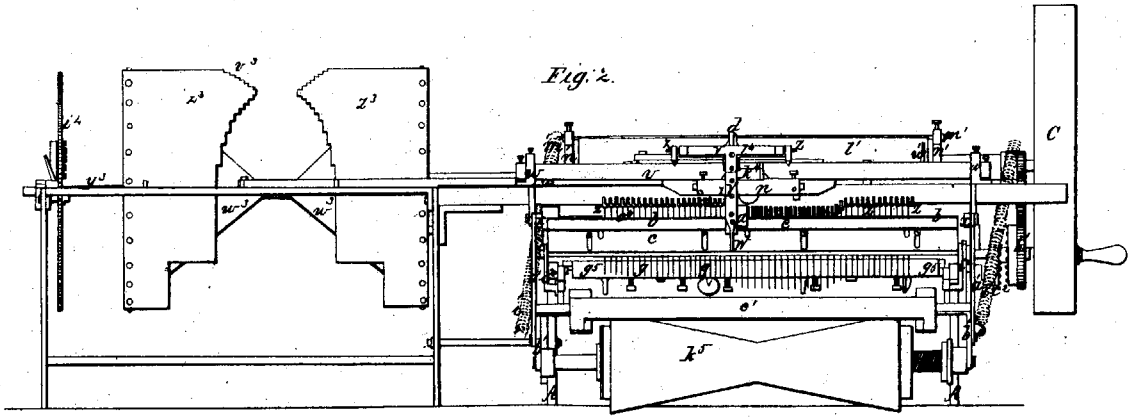
THE NORRIS PETERS CO., PHOTO-LITHO., WASHINGTON, D. C.

H. BURT.
KNITTING MACHINE.
No. 915. Reissued Feb. 28, 1860.
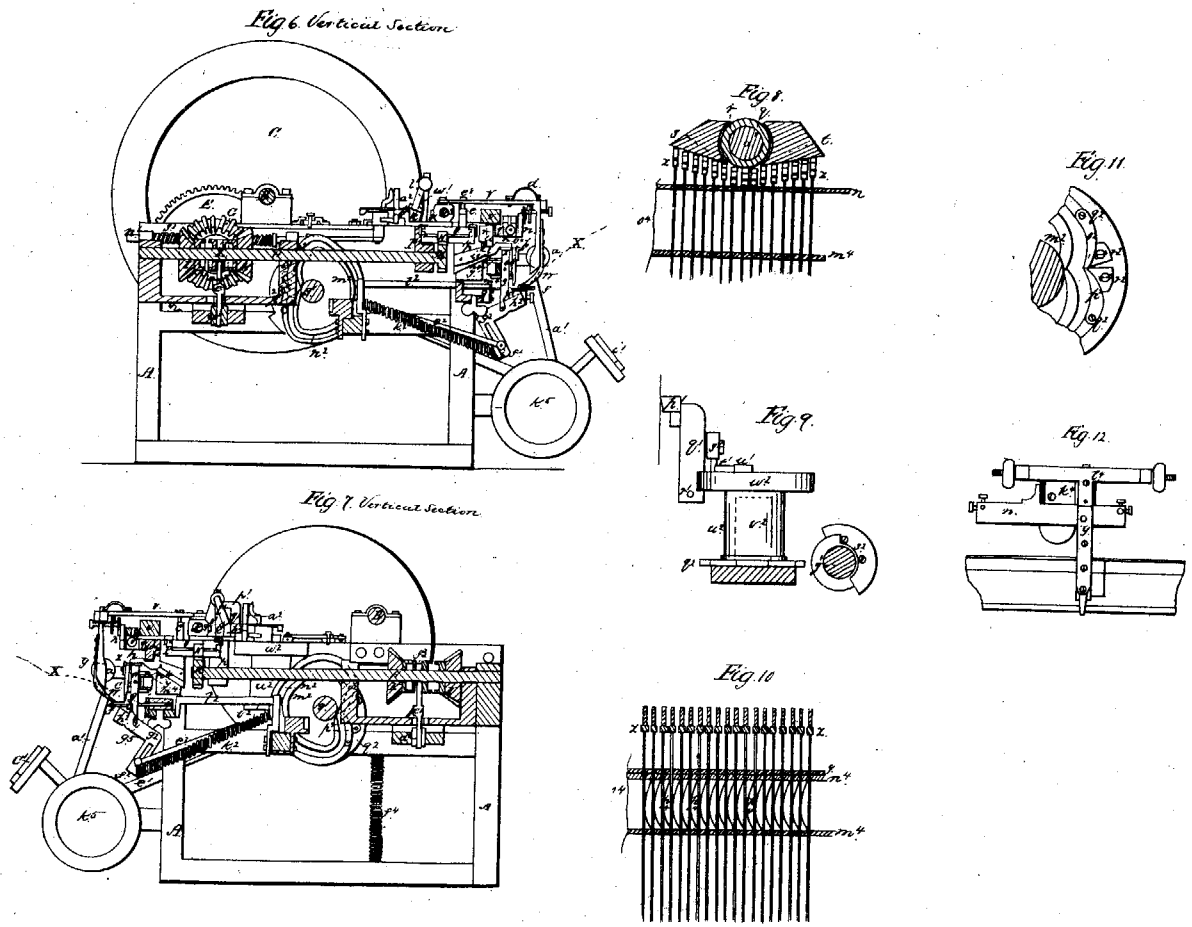
THE NORRIS PETERS CO., PHOTO-LITHO., WASHINGTON, D. C.

UNITED STATES PATENT OFFICE.

THE NEWARK PATENT HOISERY COMPANY, OF NEWARK, NEW JERSEY, ASSIGNEE, BY MESNE ASSIGNMENTS, OF HENRY BURT.

IMPROVEMENT IN THE MACHINE FOR KNITTING STOCKINGS, &c.

Specification forming part of Letters Patent No. 3,275, dated September 23, 1843; extended 7 years; Reissue No. 915, dated February 28, 1860.

*To all whom it may concern:*

Be it known that HENRY BURT, of Boston, in the county of Suffolk and State of Massachusetts, has invented certain new and useful Improvements in the Machine for Knitting Stockings, &c., the entire rights to which he has assigned to the corporation known as "THE NEWARK PATENT HOISERY COMPANY" of Newark, in the county of Essex, and State of New Jersey; and I, DAVID A. HAYES, president of said corporation, do hereby declare that the following is a full, clear, and exact description thereof, reference being made to the accompanying drawings, forming a part of this specification, that is to say—

Figure 1 represents a top view of a knitting-loom constructed on my improved plan. Fig. 2 is a front elevation of the same. Fig. 3 is an elevation of the rear side. Fig. 4 is an elevation of the right hand, and Fig. 5 is an elevation of the left hand, and Fig. 6 is a vertical section taken through the central part of that portion of the apparatus on which the weaving is accomplished, the eye of the observer being supposed looking toward the right-hand end of the machine; Fig. 7, a similar section taken with the eye of the observer looking toward the left-hand end of the mechanism.

Such other figures as may be necessary to fully exhibit the several parts will be hereinafter especially referred to.

All the operative parts are supported in their relative positions by means of a suitable frame, A. The driving-shaft is exhibited at B, Figs. 1, 6, and 7. It revolves in proper boxes or bearings situated on the top of the frame-work, and has a fly-wheel, C, and a gearing pinion, D, on one end, the said pinion engaging with a spur-gear, E, placed on one extremity of a horizontal shaft, F. (Seen in Fig. 1.) A beveled pinion, G, secured upon the other end of the shaft F, acts on the beveled wheels I K, and turns a horizontal shaft, H, either in one direction or the other, by means of a clutch, L, according to circumstances, as will be hereinafter set forth. The shaft H has a toothed pinion, M, Figs. 6 and 7, upon its other extremity, which engages with a tooth-rack, N, applied to the under side of a movable carriage or platform, O, Fig. 1. Suitable parallel rails, P P, sustain and guide the carriage O during its movements to and fro. Two vertical standards, Q Q, elevated upon the top of the carriage O support a cylindrical rod, R, extending from one to the other of them, as seen in Fig. 1. A long tube, S, fits closely but slides freely upon the cylindrical rod R. In order that it may slide upon the rod with the requisite degree of friction, a spring, T, is secured upon its upper edge, one end of the said spring having a small stud or pin projecting from its under side and passing through a suitable slot cut through the tube and resting or bearing upon the cylindrical rod R, or any other well known and suitable contrivance for producing friction may be employed in lieu thereof. A screw, U, Fig. 1, serves to regulate the pressure of the spring T upon the rod. A horizontal arm, V, extending forward from the top of the sliding tube, supports and carries the yarn guide or tube W, Figs. 6 and 7, through which the yarn X passes from the bobbin and by which it is supplied to the needles and depressing-hooks. This yarn-guide is fixed on the lower end of a T-shaped piece, Y, (see Fig. 2,) the upper ends of which are supported upon pivots or adjusting-screws Z Z, passing through the arm V, which is shaped for the purpose, as seen in Fig. 1. A small roller, *a*, Figs. 2 and 6, is attached upon the lower part of the right-hand side of the T-piece Y. When the depressing-bar *c* descends, the periphery of this roller comes into contact with the projecting edge of a horizontal ledge, *b*, arranged upon the upper part of the depressing-bar *c*, and thereby throws the yarn-guide forward or from under the depressing-bar, the purpose of which movement is to permit the depressing-bar to descend upon the hooks of the needles. On the elevation of the depressing-bar the T-piece is carried backward or beneath the depressing-bar by means of a spring, *d*, connected to the upper side of the arm V and to the top of the T-piece. The sliding carriage O has a small horizontal rail-piece, *e*, affixed to it just by the side of and extending parallel to the sliding tube S and under the arm V. A screw, *e*, passing or screwed through the arm V, abuts against the top of the rail-piece. This screw serves to elevate or depress the arm, in order to regulate the level of the point of the yarn-guide with respect to the needles. The series of needles upon which the loops for the stitches are formed is represented at *f f*. They are of the usual construction, having barbs and grooves, and are inserted in a plate or bar, $g^5$, Figs. 2, 6, and 7. Each of the needles is arranged also as usual between two vertical depressing-hooks, *g g*, of a series, and these hooks are forced downward by means of a series of short depressing-levers, *h h*, one end of each of which rests upon the top of one of the stitch-hooks, while the opposite moves upon a fulcrum or joint, *i*, Fig. 6, which permits the lever to rise and fall in a vertical plane.

The peculiar shape of the depressing-lever is exhibited in Fig. 6, wherein it will be seen that the rear part of it has a projection, *k*, on its upper side and a cavity, *l*, directly adjacent thereto, and between the fulcrum of the lever and that end which rests on the stitch-hooks. The carriage O has two arms, *m m*, Fig. 1, extending horizontally from it and united together at their ends by a cross bar, *n*, Fig. 2. A short horizontal shaft, *o*, Fig. 1, is supported between the arms *m m* by screw-pivots P P. From the central parts of the shaft *o* an arm, *q*, extends inward toward the center of the machine, the inner end terminating in a point, on which is a roller, *r*, and two inclined planes, *s t*, extending on the sides of the roller, as seen in Fig. 8, (which is a vertical section enlarged of the roller and the planes, together with some of the depressing-hooks beneath the same.) Directly by the side of the roller *r* there is another and larger roller, *u*, which is situated and moves under and against the horizontal bar *v*. The latter roller plays within the recess or cavity *l* of the depressing-levers, but does not bear upon the said lever, its object being to hold the roller *r* down in its place, and this is accomplished by the horizontal bar *v*, which extends between two uprights *w w*, as seen in Figs. 2 and 4, and has adjusting-screws by which it may be raised and depressed. The roller *r* and inclined planes *s t* act upon the top of the projections *k*, Fig. 6, of the depressing levers, and the object of each of the inclined planes is to depress the stitch-hooks or sinkers before the roller *r* commences to act thereon. By the said arrangement of inclined planes, in conjunction with the roller, the levers are depressed with less friction and liability to injury or lateral pressure than if the roller alone acted thereon. The uprights *w*, which sustain the bar *v*, are screwed to the side crank-arms, *x x*, Figs. 1, 2, and 4, which project from the journals of a plate, *y*, Figs. 1, 10, extending entirely beneath the depressing-levers, and raise the sinkers. Each of the sinkers passes through a slot or opening cut in the plate, and when the plate is raised it bears against shoulders or cap-pieces Z Z fixed on the top of the sinkers. The sinkers are supported in their vertical positions by being passed through slots sawed into two horizontal plates, $m^4 n^4$, (see Fig. 10,) which is a front view of a few of the sinkers, the depresser-bar not being exhibited, and the bar or plate $o^4$, which presses upon the front edges of the sinkers, being partially cut away to show the plates $m^4$ $n^4$ and the sinkers in the rear of it. Friction is applied to the sinkers to prevent them from dropping when they are raised by small curved pieces of watch-spring $p^4$, placed between them, as seen in Fig. 10. The uprights *w w* are placed upon the crank-arms *x x* between their fulcra and outward extremities, as seen in Fig. 4, so that when the arms are elevated the bar *v* will be raised and will permit the roller *r* and inclined planes *s t* to rise when the sinkers are elevated by the plate *y*. The crank-arms *x x* are elevated and depressed by connecting-rods *a′ a′*, jointed to the same and also jointed at their lower ends to arms *b′ b′*, Figs. 1, 2, and 4, which carry what may be termed the "cloth-bar" *c′*. This cloth bar extends between the upper ends of the two arms *b′ b′*, and is connected thereto by suitable regulating-screws correctly adjusted to the position of the needles. The object of the cloth-bar is to secure the woven cloth in its place immediately on the needles having carried the stitches through the loops and during their advancement to their proper position for the formation of the loops thereon. This is effected by the edge of the cloth-bar pinching the cloth between it and the sinkers. The arms *b′ b′* turn on fulcra at their lower ends and are forced outward by means of rods *e′ e′*, connected to them by points between their fulcra and their upper ends. The other end of each of the rods *e′ e′* abuts against one of two cams, *f′ f′*, fixed upon the cam shaft *g′*, which is revolved by a spur gear, *h′*, fixed upon it and engaging with the gear E, before mentioned. The counter action of the arms *b′ b′* is effected by springs *i′ i′*, or by any other convenient means. A long rack, *k′*, of teeth is affixed upon the lower part of the side of a vibrating plate or bar, *l′*, which is supported at its upper corners on screw points or bearings *m′*, passing through the tops of fixed standards *n′ n′*, Figs. 6 and 7. There is a small tooth or projection, O′, Figs. 6 and 7, extending from the side of the sliding tube S, and which, when the stop-rack *k* is thrown against the same, enters into one of the spaces between the teeth of the rack, and thus confines the tube *s* and yarn-guides in position, although the carriage O is still permitted to move. The lower edge or part of the bar or plate *l′*, to which the top rack is applied, is actuated or thrown toward the tube by means of an arm, *p′*, projecting from a vertical lever or piece, *q′*, which vibrates on a pin or fulcrum, *r′*, Fig. 9, at its lower end. The vertical edge of this lever opposite to that from which the arm *p′* extends has a roller, *s′*, applied to it whose periphery rolls upon a little rail, *t′*, raised upon the shifting-bar, *u′*. This rail has a curved depression, *v′*, at each of its ends, into which the roller falls when the stop rack is thrown out of gear with the tube *s*, the said rack being so thrown out of gear by means of a spring, $w'$, which presses against the lower part of the plate to which the stoprack is attached. The shifting-bar $u'$ rests and moves longitudinally upon the top of the frame A. Both ends of it bear against friction-rollers $x'$ $y'$, and the said bar has a series of teeth, Z′ Z′, formed upon its edge next the carriage O. These teeth in number correspond with the number of needles. Movable shoulder-pieces or stops $a^2$ $a^2$ are inserted in the teeth Z′ Z′ and rise above the same. They may be constructed in any convenient manner so as to be easily attached and removed from the shifting-bar, and in order to regulate their correct distances apart from each other they should have one or more teeth applied to their lower side and inserted in the spaces between the teeth Z′ Z′. A stud, $b^2$, projecting from the carriage O, extends between the stops $a^2$ $a^2$. When the stud $b^2$ comes into contact with either of the stops $a^2$ $a^2$, it causes the shifting-bar to move in one direction longitudinally, according to whichever stop it acts against. This raises the roller S′ out of the depression $v'$ to the rail $t'$, and throws the stop-rack into gear with the tooth of the tube S, and thus holds the yarn-guide still while the carriage continues to advance for the purpose of throwing the clutch L out of gear with both of the beveled wheels I K, or bringing it centrally between them, and causing a clutch, $c^2$, on the cam-shaft $g'$, to be engaged with the spur-gear $h'$, by which the cam-shaft is revolved, and also to move the roller $r$ and inclined planes $s$ $t$ to the opposite side of the yarn guide. The depressing-bar $c$ is carried downward upon the needles at the proper time by means of two cams, $d^2$ $d^2$, fixed upon the cam shaft $g'$, each of the said cams acting against the extremity of one of two pitman-rods, $e^2$ $e^2$. The opposite end of each pitman is jointed to one end, $f^2$, of a bent lever, $f^2$ $g^2$ $h^2$, which has its fulcrum at its end $h^2$, and has an arm, $i^2$, Figs. 2 and 4, applied to its outside, extending upward and jointed to the end of the depressing-bar $c$. The bent lever $f^2$ $g^2$ $h^2$ and its arm $i^2$ constitute together a toggle-joint by which the presser-bar $c$ is borne down upon the points of the needles with sufficient force to sink all of the said points into the grooves beneath them. Counteracting springs $k^2$ or other proper contrivances elevate the depressing-bar $c$ at the requisite period of time. The bar $g^5$, into which the needles are inserted, is arranged so as to be moved or slid forward and back by means of two arms, $l^2$ $l^2$, projecting from it and connected with the cams $m^2$ on the cam-shaft by means of small pins extending from the arms into grooves $n^2$ of the cams. The revolution of the cam-shaft thus actuates the bar $g^5$.

By examination of Figs. 6, 7, and 11, it will be perceived that a portion of the groove of each cam $m^2$ has two curved pieces, $o^2$ $p^2$, which turn upon centers $q^2$ $q^2$, and are capable of being moved upon the plate of the cam and set to variable distances from the center thereof, and confined in any position by screws $r^2$. The object of these movable pieces of the cam is to regulate the distance to which the needles are drawn back to draw the stitches through the loops, and this distance must vary according to the fineness or quality of the yarn used, or according to the "closeness" of the work to be produced. A helical thread or plate, $s^2$, is formed upon the crank-shaft, extending about one-half the way around the same. This operates, in connection with a horizontal toothed wheel, $t^2$, Fig. 9, which is a vertical section taken through the cam-shaft $g'$ at the place where the left-hand cam, $m^2$, is situated thereon, the said cam being supposed to be removed in order to represent the parts to the left of it, and said wheel is fitted upon a hollow vertical shaft or arbor, $u^2$, which is suitably supported and revolves on a vertical shaft, $v^2$, denoted by dotted lines on Fig. 9, and extends upward through it. A circular and horizontal head, $w^2$, is arranged on the top of the hollow arbor $u^2$, the same having a circular depresion, $x^2$, in its central part, and five or any other suitable odd number of cavities or recesses, $y^2$, radiating from the center depression, $x^2$, as seen in Fig. 1, the said cavities $y^2$ being at equal distances apart from each other. A pin, $u^7$, (represented in Fig. 1 by dotted lines,) projects from the lower side of the shifting-bar $u'$ and operates within the circular depression $x^2$ and the recesses $y^2$. On the side of the shifting bar $u'$ are two projections, $z^2$ $a^3$, between which one end of a bent lever, $b^3$, is situated, as seen in Fig. 1. The opposite end of the lever is fixed on the top of a short vertical shaft, $c^3$, Fig. 3, suitably supported in bearings. The lower end of this shaft has a horizontal lever, $d^3$, extending from it in a direction toward the left end, or right hand when viewed in Fig. 3, at a right angle to the lever on its upper end, and the left extremity of the lever $d^3$ has a short fork, $e^3$, extending upward from it and entering into a groove, $f^3$, of the clutch L.

To the upper side of the front end of the lever $b^3$ one extremity of a long connecting-rod, $g^3$, is jointed, the other end of said rod being similarly jointed to a bent lever, $h^3$ $i^3$ $k^3$, the fulcrum of which is at $i^3$, while its opposite end, $k^3$, is jointed to the upper side of a long horizontal bar, $m^3$. The bar $m^3$ is suitably supported in guides so as to have a short longitudinal motion. It is bent downward at its right-hand end, where it is forked and inserted into the groove of the clutch $c^2$, before mentioned. When the arm $k^3$ of the toggle-lever is brought into line with the arm $l^3$, the clutch L is out of gear with both of the beveled wheels I K, and the clutch $c^2$ is thrown into gear with the spur-gear $h'$, by which the cam-shaft is moved; but when the arms $k^3$ and $l^3$ make an angle with each other on the front side of the bar $m^3$, the clutch $c^2$ is thrown out of gear with the wheel A′, and the clutch L in gear with the beveled wheel I. So when the said arms form an angle with each other on the rear side of the bar $m^3$, the clutch $c^2$ is thrown out of gear with the wheel $h'$ and the clutch L in gear with the other beveled wheel, K.

In connection with the shifting-bar $u'$ is a cylindrical rod, $n^3$, sliding through bearings $o^3$ $p^3$. It is jointed at its front end to a connecting-rod, $q^3$, the opposite end of which is jointed to the shifting-bar $u'$ at a point near its right-hand end. The rod $n^3$ has a sliding collar, $r^3$, adapted to it and capable of being fixed thereon by a set-screw. One end of a strong helical spring, $s^3$, bears against the collar $r^3$, while the opposite end rests or abuts against the front side of the bearing $o^3$. This spring forces the rod $n^3$ forward or presses the shifting-bar close against the friction-roller $y'$. By inspection of Fig. 1 it will be seen that the shifting-bar has two projections, $t^3$ $w^3$, on the front side of the end of it in apposition with the roller $y'$. The part of the front side of the bar extending between the said projections is a regular curve from one to the other, as seen in the drawings. The peculiar province of these projections is, in connection with the rail $t'$, to determine the distance that the roller $r$ and its included planes shall pass beyond the thread-guide, and the manner by which the same is effected will be described after the enumeration and explanation of certain other mechanism intimately connected therewith. As the cloth is woven it is wound upon a beam or roller, $k^5$. When the yarn-guide stops at either termination of a row of stitches woven, it becomes necessary to throw its point forward a short distance in order to clear it from the sinkers which are depressed by the continued movement of the roller $r$ and its inclined planes $s$ $t$. This is accomplished by a plate, $k^4$, Fig. 12, of the requisite length, affixed to the front face of the cross piece $n$. The two vertical sides of this plate are beveled or chamfered off at about an angle of forty-five degrees each. A screw, $l^4$, is inserted through the T-piece of the yarn-guide. When the yarn-guide is laying the yarn over the needles, the end of this screw is against the cross-piece $n$, and, as soon as it becomes necessary to move the point of the yarn-guide outward, the movement of the carriage O and the stationary position of the tube S causes one of the beveled edges of the plate $k^4$ to meet the point of the screw $l^4$ and to force it outward as it rides up the inclined plane of the beveled edge, and thus removes the yarn-guide out of the way of the sinkers or depressing hooks by which the loops are formed upon the needles.

Having now described the construction of the several parts, the operation thereof will be next explained. The carriage O being put in motion carries the yarn-guide with it in in order to distribute or lay the yarn upon the shanks of the needles just in rear of their barbs. As soon as the yarn guide has arrived at the extent of its motion, determined by one of the stops $a^2$, the tube S, to which it is attached, ceases to move, or is stopped by the rack $k'$ being thrown against the tooth or projection O', and the carriage still continues its motion in order to carry the roller $r$ and inclined planes $s$ $t$ a short distance beyond the yarn-guide. During the time the yarn-guide has thus moved over the teeth it has been followed by a successive depression of the hooks or sinkers $g$ upon the yarn and between the needles, by which means a loop is formed over each of the needles. As soon as the yarn is stopped by the rack $k'$ it is thrown forward by the plate $k^4$, as before mentioned, in order to clear it from the succeeding stitch-hooks, depressed by the roller $r$. The needles then retreat a short distance so as to bring the points of their barbs over and beyond the loops. The depressing-bar $c$ then descends upon the upper side of the barbs of the needles and presses them down into the grooves in the shanks of the needles. The needles then retreat and carry their barbs through the stitches of the previous course upon them, and at the same time drag the loops through the stitches, thus forming new stitches of the said loops. The cloth-bar $c$ also rises against the cloth and retains the same back in its place, or against that part of the sinkers below the stitch-hooks, and during the advancement of the needles forward to receive a new row of loops. The plate $y$, which elevates the sinkers, together with the roller-bar $v$ also rise at the same time. As soon as the needles have completed their advancement forward the cloth-bar descends or is drawn away from the cloth. The projections $t^3$ $w^3$, before mentioned, are intended to effect the change of clutches of the impelling shafts. When the shifting-bar has thrown the rack-bar forward so as to arrest the movement of the tube S, it becomes necessary to apply some retentive power to the shifting-bar in order to counteract the tendency of the spring $s^3$ to slide it longitudinally and change the clutches before the requisite time, and this is attained by means of the projections $t^3$ $w^3$ and the friction-curve between them, for while the roller $r$ and inclined planes are passing beyond the thread-guide the friction-roller $y'$ is in contact with either the right or left half of the curve between the projections, and is rising up the said curve and pressing the right end of the shifting-bar laterally until the roller $r$ has attained the extent of its motion beyond the thread guide, then the projection or end of the curve passes by the center of the roller, and thus throws the whole power of the spring $s^3$ upon the shifting-bar, thus sliding the same longitudinally, effecting the change of the clutch, and stopping the carriage O during the time of the revolution of the cam-shaft. In order to prevent the power of the spring from throwing the clutch L into gear with one of the beveled wheels, the pin $a^7$, before mentioned as projecting from the under side of the shifting-bar and entering into the circular depression $x$ strikes against that part of the vertical periphery of the circular depression which is between two of the spaces $y^2$ radiating therefrom. Then, while the cam-shaft is revolving, the helical thread or plate $s^2$, described in Fig. 9, turns the toothed wheel $t^2$ and the arbor $u^2$ a sufficient distance to bring one of the recesses $y^2$ in apposition with the pin, which being accomplished, the spring $s^3$ will throw the shifting-bar a still farther distance longitudinally, or the pin thereof into the said recess, and thus again effect a change of the clutches in order to move the carriage O and the yarn-guide in an opposite direction.

Having thus described the character of the invention of the said HENRY BURT, what is claimed therein as new, and which the aforesaid company desires to secure by Letters Patent, is—

1. The mechanism for "narrowing and widening," the same consisting of the movable stops $a^2$ $a^2$, combined with a rack of teeth or other suitable contrivance formed upon the shifting-bar and acting upon the carriage O of the yarn-guide, as set forth.

2. The stop-rack $k'$, combined with the tube S of the yarn-guide, and actuated in the manner and for the purpose as set forth.

3. The mechanism which effects the changes of the clutches, the same consisting of the shifting-bar, the arbor $u^2$, having a circular depression and radial recesses in its head, and levers and other parts connected to the same and connecting the same with the clutches, the whole being arranged and operating substantially as hereinbefore specified.

4. The stationary roller $y'$ and the projections $t^3$ $u^3$ and their intervening curve formed upon the shifting-bar, in combination with the spring $s^3$ of the sliding toggle-bars, and also in combination with the rail $t'$ and its depressions, the whole being for the object as described.

5. The cloth-bar $c'$, arranged and operating in the manner and for the purpose as set forth.

6. The particular method by which the depressing-bar $c$ is carried and forced down upon the pointed ends or barbs of the needles in order to press them into the grooves in their shanks, viz., by a combination of bent levers, $f^2$ $g^2$ $h^2$ and arms $i^2$, the same being actuated substantially as described.

7. The manner of raising the stitch-hooks, viz., by an elevating-plate, $y$, through which they extend and which is combined with and operates them, as set forth.

8. The method of clearing the point or lower end of the yarn-guide from the depressing-bar when the latter descends upon the needles, viz., by a ledge, $b$, on the said bar, in combination with the roller $a$, applied to the T-piece of the yarn-guide, the whole being as specified.

9. The method of clearing the point of the yarn-guide from the stitch-hooks when the roller $r$ passes by the thread guide, or as soon as the lateral motion of the thread-guide is stopped, viz, by the beveled edge-plate $k''$, in combination with the screw or other contrivance of similar character projecting from the T-piece of the yarn-guide.

10. The mode of adjusting or regulating the distance to which the points of the needles shall retreat, viz., by the movable curved pieces $o^2$ $p^2$, making part of the cam $m^2$, the same being arranged and operating substantially as explained.

11. The combination with the mechanism being the arm $q$ and shaft $o$, supported by pivots $p$ $p$, which sustains and carries the roller $r$ of the depressing and elevating bar $v$, raised and depressed by machinery, substantially as described.

In testimony whereof I, the said DAVID A. HAYES, have hereunto subscribed my name as such president, and have caused the seal of said corporation to be affixed hereunto this 26th day of December, A. D. 1859.

DAVID A. HAYES. [S. S.]
*President, &c.*

Witnesses:
J. P. PIRSSON.
S. H. MAYNARD.